(12) United States Patent
Karame et al.

(10) Patent No.: US 10,664,353 B2
(45) Date of Patent: May 26, 2020

(54) METHOD AND SYSTEM FOR BYZANTINE FAULT-TOLERANCE REPLICATING OF DATA ON A PLURALITY OF SERVERS

(71) Applicant: NEC Laboratories Europe GmbH, Heidelberg (DE)

(72) Inventors: Ghassan Karame, Heidelberg (DE); Wenting Li, Heidelberg (DE); Jian Liu, Helsinki (FI); Nadarajah Asokan, Espoo (FI); Andrew Paverd, Espoo (FI)

(73) Assignee: NEC CORPORATION, Tokyo (JP)

( * ) Notice: Subject to any disclaimer, the term of this patent is extended or adjusted under 35 U.S.C. 154(b) by 187 days.

(21) Appl. No.: 16/027,285

(22) Filed: Jul. 4, 2018

(65) Prior Publication Data

US 2018/0329783 A1    Nov. 15, 2018

Related U.S. Application Data

(63) Continuation of application No. 15/575,398, filed as application No. PCT/EP2016/073689 on Oct. 4, 2016, now Pat. No. 10,049,017.

(51) Int. Cl.
*G06F 11/00*    (2006.01)
*G06F 11/14*    (2006.01)
(Continued)

(52) U.S. Cl.
CPC .......... *G06F 11/1451* (2013.01); *G06F 11/07* (2013.01); *G06F 11/0709* (2013.01);
(Continued)

(58) Field of Classification Search
CPC .. G06F 11/2069; G06F 11/0709; G06F 11/07; G06F 11/00; G06F 11/006; G06F 11/1451
See application file for complete search history.

(56) References Cited

U.S. PATENT DOCUMENTS 4,569,015 A    2/1986  Dolev et al.
6,671,821 B1 *  12/2003  Castro .................. G06F 21/577
                                                          714/4.3
(Continued)

FOREIGN PATENT DOCUMENTS

WO    WO 2011023979 A    3/2011

OTHER PUBLICATIONS

U.S. Appl. No. 15/575,398, filed Nov. 20, 2017.
(Continued)

*Primary Examiner* — Charles Ehne
(74) *Attorney, Agent, or Firm* — Leydig, Voit & Mayer, Ltd.

(57) ABSTRACT

A method for byzantine fault-tolerant replication of data on a plurality of n servers includes performing, by a primary node (PN), a prepare procedure that includes computing a prepare message including a unique identifier and multicasting the prepare message to the REPN. The method further includes performing, by the PN, a commit procedure that includes receiving, from each of a portion of the REPN, a prepare message reply signature part and aggregating each of the prepare message reply signature parts to generate a prepare message reply aggregated signature, checking the validity of the prepare message reply aggregated signature, and upon determining that the prepare message reply aggregated signature is valid, computing a commit message including the prepare message reply aggregated signature and multicasting the commit message to the REPN. The method further includes transmitting, to the client, the commit message reply aggregated signature.

15 Claims, 4 Drawing Sheets

(51) Int. Cl.
*G06F 11/20* (2006.01)
*H04L 9/32* (2006.01)
*G06F 11/07* (2006.01)
*G06F 11/18* (2006.01)

(52) U.S. Cl.
CPC .......... *G06F 11/182* (2013.01); *G06F 11/187* (2013.01); *G06F 11/2023* (2013.01); *G06F 11/2058* (2013.01); *G06F 11/2064* (2013.01); *G06F 11/2069* (2013.01); *G06F 11/2071* (2013.01); *G06F 11/2097* (2013.01); *H04L 9/3247* (2013.01); *G06F 11/006* (2013.01); *G06F 2201/805* (2013.01); *G06F 2201/82* (2013.01); *G06F 2201/83* (2013.01); *G06F 2201/84* (2013.01)

(56) References Cited

U.S. PATENT DOCUMENTS

| | | | |
|---|---|---|---|
| 8,527,769 | B2 | 9/2013 | Kotla et al. |
| 8,549,142 | B2 * | 10/2013 | Goose .................. G06F 9/5072 709/224 |
| 8,972,732 | B2 | 3/2015 | Kotla et al. |
| 9,684,554 | B2 | 6/2017 | Candea et al. |
| 9,753,792 | B2 | 9/2017 | Dobre et al. |
| 2010/0318786 | A1 | 12/2010 | Douceur et al. |
| 2012/0150802 | A1 | 6/2012 | Popov et al. |
| 2014/0201565 | A1 | 7/2014 | Candea et al. |
| 2016/0283123 | A1 | 9/2016 | Dobre et al. |

OTHER PUBLICATIONS

Byung-Gon Chun et al: "Attested append-only memory", Proceeding SOSP '07 ?ACM SOSP. Proceedings of the ACM Symposium on Operating Systems Principles, ACM, ACM; US, Oct. 14, 2007 (Oct. 14, 2007), pp. 189-204, XP058165170.

Giuliana Santos Veronese et al: "Efficient Byzantine Fault-Tolerance", IEEE Transactions on Computers, IEEE Service Center, Los Alamitos, CA, US, vol. 62, No. 1, Jan. 1, 2013 (Jan. 1, 2013), pp. 16-30, XP014475447.

Miguel Castro, et al., "Practical Byzantine Fault Tolerance", Proceedings of the Third Symposium on Operating Systems Design and Implementation, Feb. 1999, pp. 1-14.

* cited by examiner

METHOD AND SYSTEM FOR BYZANTINE FAULT-TOLERANCE REPLICATING OF DATA ON A PLURALITY OF SERVERS

CROSS REFERENCE TO RELATED APPLICATIONS

This application is a continuation of U.S. patent application Ser. No. 15/575,398, filed on Nov. 20, 2017, which is a U.S. National Stage Application under 35 U.S.C. § 371 of International Application No. PCT/EP2016/073689 filed on Oct. 4, 2016. The International Application was published in English on Nov. 2, 2017 as WO 2017/186317 A1 under PCT Article 21(2). The subject matter of these applications is hereby incorporated by reference herein.

FIELD

The present invention relates to a method for byzantine fault-tolerance replicating of data on a plurality of n servers by a client, said n servers comprising one primary node, 'PN' and n−1 replica nodes, 'REPN', wherein f servers may arbitrarily fail, and wherein all n servers having a trusted computing entity, 'TCE'. The present invention further relates to a system for byzantine fault-tolerance replicating of data comprising a plurality of n servers, said n servers comprising one primary node, 'PN' and n−1 replica nodes, 'REPN', wherein f servers may arbitrarily fail, and wherein all n servers having a trusted computing entity, 'TCE'. The present invention further relates to a non-transitory computer readable medium storing a program causing a computer to execute a method for byzantine fault-tolerance replicating of data on a plurality of n servers by a client, said client n servers comprising one primary node, 'PN' and n−1 replica nodes, 'REPN', wherein f servers may arbitrarily fail, and wherein all n servers having a trusted computing entity, 'TCE'.

BACKGROUND

With the widespread deployment of cryptocurrencies like Bitcoin, one of their supporting technologies, blockchain, becomes increasingly popular. It is a distributed consensus protocol that serves as a public ledger for cryptocurrency transactions. One of the problems is that their consensus protocols provide only probabilistic consistency guarantees.

In order to build a distributed consensus systems that provide strong consistency guarantees, financial institutions have begun to investigate the traditional Byzantine fault tolerant (BFT) protocols, which enable n servers to collectively act as a single machine even if f of them misbehave or malfunction in arbitrary ("Byzantine") ways. However, practitioners usually hesitate to deploy such BFT protocols because of two reasons. The first reason is their poor scalability in terms of number of servers due to their intensive network communication which often involves as many as $O(n^2)$ messages for each request as for example disclosed in the non-patent literature of B.-G. Chun, P. Maniatis, S. Shenker, and J. Kubiatowicz, "Attested append only memory: Making adversaries stick to their word," in Proceedings of Twenty-first ACM SIGOPS Symposium on Operating Systems Principles, ser. SOSP '07. New York, N.Y., USA: ACM, 2007, pp. 189-204, available online: http://doi.acm.org/10.1145/1294261.1294280. The second reason is their high resource consumption, which requires n≥3f+1 servers to tolerate up to f faults as for example disclosed in the non-patent literature of M. Castro and B. Liskov, "Practical byzantine fault tolerance," in Proceedings of the Third Symposium on Operating Systems Design and Implementation, ser. OSDI '99. Berkeley, Calif., USA: USENIX Association, 1999, pp. 173-186, available online http://dLacm.org/citation.cfm?id=296806.296824.

Arbitrary faults, usually called Byzantine faults, disclosed in the non-patent literature of E. Syta, I. Tamas, D. Visher, D. I. Wolinsky, L. Gasser, N. Gailly, and B. Ford, "Keeping authorities "honest or bust" with decentralized Witness cosigning," in 37th IEEE Symposium on Security and Privacy, 2016, do not put any constraints on how processes fail. This sort of assumption about how processes fail, is specially adequate for systems where malicious attacks and intrusions can occur. For instance, an attacker might modify the behaviour of a process that he/she controls in order to change the outcome of the consensus algorithm, eventually causing the rest of the system to act in an erroneous way. When assuming Byzantine faults, instead of the more typical assumption of crash faults, this leads to more complex and challenging procedures.

Asynchrony might also be described as a non-assumption about timing properties, i.e., there is no need to make assumptions about the processing speeds of nodes and delays on message transmission. This (non-)assumption is important because attackers can often violate some timing properties by launching denial-of-service attacks against processes or communications. For instance, the attacker might delay the communication of a process for an interval, breaking some assumption about the timeliness of the system.

This system model—Byzantine faults and asynchrony—leads to an impossibility result, which says that consensus can not be deterministically solved in an asynchronous system if a single process can crash (often called the Fischer-Lynch-Paterson, FLP, result as described in the non-patent literature of T. C. Group, "Tpm main, part 1 design principles. specification version 1.2, revision 103." 2007. The reason for the impossibility is that in an asynchronous system it is impossible to differentiate a crashed process from another that is simply slow (or connected by a slow network link).

Another conventional BFT-protocol called practical Byzantine fault tolerance (PBFT) for state machine replication services is shown in the non-patent literature of B.-G. Chun, P. Maniatis, S. Shenker, and J. Kubiatowicz, "Attested append only memory: Making adversaries stick to their word," in Proceedings of Twenty-first ACM SIGOPS Symposium on Operating Systems Principles, ser. SOSP '07. New York, N.Y., USA: ACM, 2007, pp. 189-204, available online: http://doi.acm.org/10.1145/1294261.1294280. Such a service is modeled as a state machine that is replicated across different servers in a distributed system. Each server maintains the service state and implements the service operations. Clients send requests to execute operations to the servers and PBFT ensures that all non-faulty servers execute the same operations in the same order.

In the non-patent literature of G. S. Veronese, M. Correia, A. N. Bessani, L. C. Lung, and P. Verissimo, "Efficient byzantine fault-tolerance," IEEE Transactions on Computers, vol. 62, no. 1, pp. 16-30, January 2013, another conventional Byzantine Fault-Tolerant state machine replication protocol called MinBFT is described, which reduces the number of required servers from 3f+1 to 2f+1 and the number of communication rounds from 3 to 2. A trusted monotonic counter is used to build a Unique Sequential Identifier Generator (USIG), which is a local service that exists in every server. It assigns each requested message M a unique identifier (UI), which is a cryptographic signature of M together with a unique, monotonic and sequential counter c. These three properties imply that the USIG (1) will never assign the same identifier to two different messages (uniqueness), (2) will never assign an identifier that is lower than a previous one (monotonicity), and (3) will never assign an identifier that is not the successor of the previous one (sequentiality). These properties are guaranteed even if the server is compromised, and the service is implemented inside a trusted execution environment. In the non-patent literature of T.C. Group, "Tpm main, part 1 design principles, specification version 1.2, revision 103", 2007, a Trusted Platform Module TPM is described to build a USIG service, which takes 797 ms to generate a signed counter. However one of the problems is the poor performance of the TPM-based USIG, partially due to the rate limiting. The TPM specification defines that the monotonic counter "must allow for 7 years of increments every 5 seconds" and "must support an increment rate of once every 5 seconds". Another reason is the time that TPM takes to generate a signature being approximately 700 ms.

SUMMARY

In an embodiment, the present invention provides a method for byzantine fault-tolerant replication of data on a plurality of n servers, wherein the n servers include one primary node (PN) and n−1 replica nodes (REPN), wherein all n servers include a trusted computing entity (TCE), and wherein the PN receives a request message from a client. The method includes performing, by the PN, a prepare procedure that includes computing a prepare message including a unique identifier (UI) computed by the TCE of PN and multicasting the prepare message to the REPN. The method further includes performing, by the PN, a commit procedure that includes receiving, from each of a portion of the REPN, a prepare message reply signature part and aggregating each of the prepare message reply signature parts to generate a prepare message reply aggregated signature, checking the validity of the prepare message reply aggregated signature, and upon determining that the prepare message reply aggregated signature is valid, computing a commit message including the prepare message reply aggregated signature and multicasting the commit message to the REPN. The method further includes performing, by the PN, a reply procedure that includes receiving, from each of the portion of the REPN, a commit message reply signature part and aggregating each of the commit message reply signature parts to generate a commit message reply aggregated signature, and transmitting, to the client, the commit message reply aggregated signature.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention increase the performance and scalability of byzantine fault-tolerant replication of data. Embodiments of the present invention efficiently providing a USIG.

In an embodiment, the present invention provides a method for byzantine fault-tolerant replication of data on a plurality of n servers, said n servers comprising one primary node, 'PN' and n−1 replica nodes, 'REPN', wherein f servers may arbitrarily fail, and wherein all n servers having a trusted computing entity, 'TCE', comprising the steps of:
  a) Performing a request procedure,
  b) Performing a prepare procedure
  c) Performing a commit procedure and
  d) Performing a reply procedure,
Wherein said request procedure according to a) comprises the steps of:
  Providing, by a client, a request message for requesting a certain operation,
  Transmitting, by said client, said request message to all n servers,
And wherein said prepare procedure according to b) comprises the steps of
  Computing, by said PN, a prepare message including at least part of the content of said request message and a unique identifier, 'UI', said UI being computed by said TCE of said PN, said UI being based on a cryptographic signature of said request message and a unique, monotonic, sequential counter, 'UMSC',
  providing said prepare message to said REPN,
And wherein said commit procedure according to c) comprises the steps of
  Validating said prepare message by checking the UI,
  Upon positive verification of said prepare message, computing a commit message, by said PN or by each of said REPN, including said valid unique identifier and at least the content of said prepare message, wherein in case of computing said commit message by each of said REPN, the computed commit messages include all the same part of the content of said prepare message,
  Multicasting said commit message by said PN or by each of said REPN,
And wherein said reply procedure according to d) comprises the steps of
  Validating, by each server, the unique identifiers of received commit messages, when the number of valid received commits from different servers is greater than f,
  Computing a reply message for said client.

In a further embodiment, the present invention provides a system for byzantine fault-tolerant replication of data comprising a plurality of n servers, said n servers comprising one primary node, 'PN' and n−1 replica nodes, 'REPN', wherein f servers may arbitrarily fail, and wherein all servers having a trusted computing entity, 'TCE', A client being adapted to perform a) a request procedure, Said PN being adapted to perform b) a prepare procedure, Said PN or each of said REPN being adapted to perform a commit procedure, and Said servers being adapted to perform a reply procedure, Wherein said request procedure according to a) comprises the steps of: Providing a request message for requesting a certain operation, Transmitting said request message to all n servers, And wherein said prepare procedure according to b) comprises the steps of Computing a prepare message including at least part of the content of said request message and a unique identifier 'UI', said UI being computed by said TCE, said UI being based on a cryptographic signature of said request message and a unique, monotonic, sequential counter, 'UMSC', providing said prepare message to said REPN, And wherein said commit procedure according to c) comprises the steps of Validating said prepare message by checking the UI, Upon positive verification of said prepare message, computing a commit message including said valid unique identifier and at least the content of said prepare message, wherein in case of computing said commit message by each of said REPN, the computed commit messages include all the same part of the content of said prepare message, Multicasting said commit message by said PN or by each of said REPN, And wherein said reply procedure according to d) comprises the steps of Validating, by each server, the unique identifiers of received commit messages, when the number of valid received commits from different servers is greater than f, Computing a reply message for a client.

In a further embodiment, the present invention provides a non-transitory computer readable medium storing a program causing a computer to execute a method for byzantine fault-tolerant replication of data on a plurality of n servers, said n servers comprising one primary node, 'PN' and n−1 replica nodes, 'REPN', wherein f servers may arbitrarily fail, and wherein all n servers having a trusted computing entity, 'TCE', comprising the steps of:

a) Performing a request procedure,
b) Performing a prepare procedure,
c) Performing a commit procedure and
d) Performing a reply procedure, Wherein said request procedure according to a) comprises the steps of:

Providing, by a client, a request message for requesting a certain operation,
Transmitting, by said client, said request message to all n servers, And wherein said prepare procedure according to b) comprises the steps of Computing, by said PN, a prepare message including at least part of the content of said request message and a unique identifier, 'UI', said UI being computed by said TCE of said PN, said UI being based on a cryptographic signature of said request message and a unique, monotonic, sequential counter, 'UMSC',
providing said prepare message to said REPN, And wherein said commit procedure according to c) comprises the steps of Validating said prepare message by checking the UI,
Upon positive verification of said prepare message, computing a commit message, by said PN or by each of said REPN, including said valid unique identifier and at least the content of said prepare message, wherein in case of computing said commit message by each of said REPN, the computed commit messages include all the same part of the content of said prepare message,
Multicasting said commit message by said PN or by each of said REPN, And wherein said reply procedure according to d) comprises the steps of Validating, by each server, the unique identifiers of received commit messages, when the number of valid received commits from different servers is greater than f,
Computing a reply message for said client.

For the commit messages during the commit procedure, all commit messages can consist of or comprise the same plaintext signed by each replica.

At least one embodiment may have the advantage of a faster generation of a unique monotonic sequential counter and therefore simplicity and communication complexity compared with conventional byzantine free tolerance data replication methods is enhanced. Moreover at least one embodiment may have the advantage of the performance being only dependent from the TCE, which is in general CPU-based and does therefore not constitute any bottleneck in particular with regard to communication with other servers. Even further at least one embodiment may have the advantage of the number of required servers being only 2f+1 and the number of communication rounds being only 2.

| Notation | Description |
| --- | --- |
| Entities | |
| C | Client |
| S | Server |
| $S_p$ | Primary |
| $S_i$ | Backup |
| USIG | Unique Sequential Identifier Generator |
| Objects | |
| M | Request message |
| UI | Unique Identifier |
| N | Ephemeral nonce |
| Parameters | |
| n | Number of servers |
| f | Number of faulty servers |
| p | Primary number |
| v | View number |
| c | Counter value |
| Cryptographic Notations | |
| H ( ) | Cryptographic hash function |
| h | Cryptographic hash |
| o | Signature |
| x | Secret (signing) key |
| X | Public (verification) key |

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

The terms "client", "server", "primary node", and "replica node" can each refer to an entity, device or computing device adapted to perform computing like a personal computer, a tablet, a mobile phone, a server, or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The entities may be adapted in such a way that the corresponding steps to be computed are performed in an optimized way. For instance different steps may be performed in parallel with a single processor on different of its cores. Further a plurality of same or different entities may be identical forming a single computing entity. The entity or entities may also be instantiated as a virtual entity running on a single or a plurality of physical computing resources. Different entities may therefore be executed on said physical computing resource.

The term "trusted computing entity" or "TCE" can refer to an entity, device or computing device isolating and protecting security-critical logic from all other hardware and software running on an entity or server. A trusting computing entity provides confidentiality and integrity protection for a trusted application running within a trusted execution environment respectively on said trusting computing entity, ensuring that no application running outside said trusted execution environment can interfere with the trusted application's operation. The trusted execution environment provided or spanned by a trusted computing entity may provide some form of remote attestation allowing remote users to certain the current configuration and behavior of a trusted application. The trusted execution environment may be provided in form of a central processing unit or the like.

The term "multicasting" can refer to a group communication where information is addressed to a group of destination devices simultaneously. Multicast is also known as a one-to-many or many-to-many communication.

The term "unique, monotonic and sequential counter" with regard to a message refers in particular in the claims, preferably in the specification to an information, data or message to which a counter is assigned which is never the same for two different information (uniqueness), which is lower than a previous one (monotonicity) and which is not the successor of the previous one (sequentiality).

The terms "star topology" and "tree topology" respectively can be understood in their respective broadest sense and to a connection topology between servers which may be physically and/or virtually organized as a star or a tree respectively. In a star topology an entity or device forming the center of the star is physically and/or virtually connected directly to each of the other entities or devices in this topology. In a tree topology one of the entities or devices performing the network is a root of the tree which is connected to one or more children, wherein said children may be again connected to one or more other children and so on.

The term "collective" with regard to the terms "signing" or "signature" can be understood in its broadest sense and can refer to a procedure enabling a number of servers to collectively sign a message in a scalable way. Said collective signing procedure is based on n servers being organized in a spanning tree, wherein the node at the root is selected as the leader initializing the collective signing rounds and proposes the messages to be signed. This spanning tree of depth O(log n) can distribute both communication and computation to incur at most logarithmic costs per node.

An example of a collective signing procedure comprises of the following phases used here with Schnorr multisignature and preprocessing:

1) Setup: Each node $S_i$ chooses a random secret key $x_i$, and computes the public key $X_i=g_i^x$ as well as a zero-knowledge proof $ZK_i$ to prove knowledge of the corresponding secret key. Otherwise, a dishonest $S_i$ can perform a related-key attack against a victim node $S_j$ by choosing $X_i=g^{x_i}X_j^{-1}$, and thereafter contribute to collective signatures apparently signed by $S_j$ without $S_j$'s actual participation. In a bottom-up process, $S_i$ sends all Xs and ZKs to its parent, and calculates a partial aggregate public key $\hat{X}_i=X_i\Pi_{j\in\varnothing_i}\hat{X}_j$ where $\varnothing_i$ is the set of $S_i$'s immediate children.

2) Preprocessing: Each $S_i$ picks a random secret $v_i$ and computes its individual commit $V_i=g^{v_i}$. Then, in a artial aggregate commit $\hat{V}_j$ from each immediate child $S_j$, if any. $S_i$ then computes its own aggregate commit $\hat{V}_i=V_i\Pi_{j\in\varnothing_i}\hat{V}_j$. Finally, $S_i$ passes $\hat{V}_i$ up to its parent, unless $S_i$ is the leader multiple commits can the generated in a single round, since the commits are request independent.

3) Announce: The leader computes a collective challenge $c=H(\hat{V}_0\|M)$, then multicasts c down through the tree, along with the statement M to be signed.

4) Response: Each $S_i$ computes its individual response $r_i=v_i-cx_i$ and waits to receive a partial aggregate response $\hat{r}_j$ from each of its immediate children $S_j$. Then $S_i$ calculate its own response $\hat{r}_i=r_i+\Sigma_{j\in\Pi_j}\hat{r}_j$. Notice that $(H(\hat{V}_i\|M), \hat{r}_i$ forms a valid Schnorr multisignature on statement M. $S_i$ checks its validity by computing $\hat{V}'_i=g^{\hat{r}_i}\hat{X}_i^c$, and checking that $(H(\hat{V}_i\|M) \stackrel{?}{=} H(\hat{V}'_i\|M)$. If correct, $S_i$ passes $\hat{r}_i$ up to its parent, unless $S_i$ is the leader.

The final collective signature is $(c, \hat{r}_0)$, which can be verified by any third-party by recomputing $\hat{V}'_0=g^{\hat{r}_0}\hat{X}_0^c$ and checking that $c \stackrel{?}{=} H(\hat{V}'_0\|M)$.

The term "aggregated" with regard to the term "signature" can refer to a signature generated by using signature parts, said signature parts being generated by different entities or devices and being collected before, to compute a single aggregated signature.

The term "checkpoint" can be understood in its broadest sense and can refer to a database or a log file, comprising relevant entries for providing certain information of a configuration of an entity, server, computing device or the like. For instance servers may generate checkpoints in a regular time-basis.

The term "view" can be understood in its broadest sense and can refer to a certain network configuration. For example in a view one server is the primary server PN and the other servers are backup servers.

For instance PN picks the ordering for execution of operations requested by clients C. For instance it does this by assigning the next available sequence number to a request and sending this assignment to the backups. But PN may be faulty: it may assign the same sequence number to different requests, stop assigning sequence numbers, or leave gaps between sequence numbers. Therefore the backups may check the sequence numbers assigned by the PN and use timeouts to detect when it stops. They may trigger view changes to select a new PN when it appears that the current one has failed.

The unique identifier in said commit procedure may comprise an aggregated signature received by said PN from said REPN, each REPN computing its own signature part being aggregated along the connections between said REPN to said PN. This enables to improve the communication complexity from $O(n^2)$ to $O(n)$.

Said aggregated signature may be obtained using a collective signing procedure between said PN and each of said REPN. This further improves the scalability and efficiency.

A result of the requested operation may be included in said reply message, said result being computed by each of said REPN. This enables the PN to collect all the results and provide the results to the client without the bourdon of the client to collect individually each result from each REPN.

Each REPN may compute its own signature part of the computed result and wherein said PN may aggregate said signature parts of the result. This further enhances a scalability and performance.

Upon invalidity of an aggregated signature a binary search by said PN may be performed on said received signature parts to identify and discard wrong signature parts. This enables in an easy and fast way to compute a valid aggregated signature.

The connections between said servers may be organized in a tree topology with said PN being the root of said tree or in a star topology with said PN being the center of said star. For example in case of a star-like structure direct connections to the center of the star, i.e. the PN, is provided and communication can be directly performed between each REPN and said PN. Thus, efficiency is improved.

The TCE of said PN may compute two initial counters, one representing a current hardware counter of said server, one a counter generated with a certain starting value and wherein during said prepare procedure said unique identifier is signed by said TCE with both counters and wherein upon each reboot said starting value is increased by a certain defined value. For example said starting value may be 0 and wherein said defined value by which said starting value is increased is 1. This further enhances the security.

Said PN may be selected out of all servers and wherein when said PN is determined to be faulty, a new PN out of REPN may be selected. This enables to provide in an efficient way a replacement of a faulty PN by a new non-faulty PN.

A PN may be determined faulty by a REPN by not receiving a prepare message after expiry for certain time after receiving said request message. This enables in a very easy way to determine a PN being faulty by a REPN.

Said new PN may be selected by the steps of

Requesting a view change by a REPN after expiry of said certain time period by sending a change message to all other REPN, Multicasting a view change message, after having received f+1 change messages, by a REPN, a set of all messages since a last checkpoint was generated together with a checkpoint certificate, A new PN is selected when having received f+1 view change messages and said new PN multicasts a new view message indicating that a new PN is established.

This enables in an easy way providing a view change, i.e. selection of a new primary node and in a secure way to switch from a faulty PN to a non-faulty PN. For instance after a server has produced a checkpoint the server multicasts a message (CHECKPOINT, $UI_{latest}$, h, $UI_j S_i$) where $UI_{latest}$ is the unique identifier of the latest executed request, it is the hash of the server's state and UIj is obtained by calling a USIG for the checkpoint message itself. A server considers that a checkpoint is stable when it receives f+1 CHECKPOINT messages signed by different replica servers with the same $UI_{latest}$ and h. This set of messages is called a checkpoint certificate, which proves that the server's state was correct until that request execution. Therefore, the replica servers can discard all entries in its log with sequence number less than the counter value of $UI_{latest}$.

At the beginning of a new view the following steps may be performed:

generating a random ephemeral nonce and a counter with a certain starting value change by said TCE of said PN after each start of said PN, computing a local signature on said counter and said generated nonce.

providing said local signature to all REPN verifying said provided signature by each of said REPN and whenever said REPN has received a different nonce from said PN, said REPN initiates a view change to select a new PN of said REPN.

This enables an efficient use of counters within a trusted execution environment. In other words the nonce can be generated only rarely, but the computation of a next USIG is very fast because the counter can be incremented without the use of a trusted execution environment. In detail a trusted application generates a random ephemeral nonce N and a counter c with value 0 after each machine rebooting. At the beginning of each view, $S_p$ lets its local TA generate a signature $\langle c, N \rangle_{\sigma p}$ and sends it to all servers. Each $S_i$ verify it, and they expect an receive a counter value of c+1 for the next message. Whenever $S_i$ sees a different nonce from $S_p$ a view change is initialized. Thus, the servers will do a view change for each machine rebooting of $S_p$, even though $S_p$ is honest but enabling fast counters to be maintained within the trusted application.

Checkpoints may be generated periodically by each server. For example, the periodicity of the checkpoints is based on a request sequence number being devisable by a certain constant. This ensures a steady and therefore reliable provision of actual checkpoints by each of the servers.

A view number may be included into the messages for indicating a current view determine in a certain server being PN and other servers being REPN. This enables with a minimum of information to provide information about a current configuration of all servers and therefore enabling an easy change if a PN is faulty.

Figure 1:
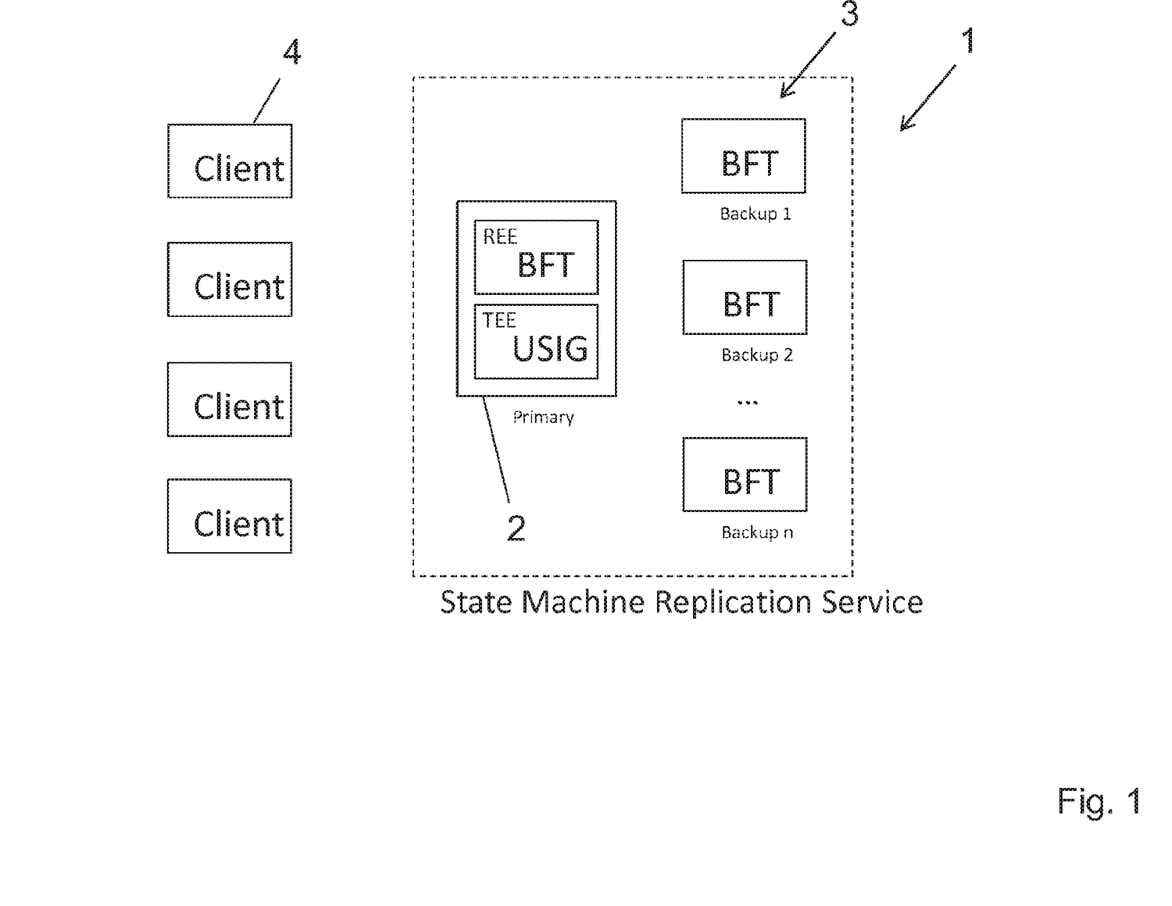
FIG. 1 shows a system according to an embodiment of the present invention.

FIG. 1 shows a system according to an embodiment of the present invention. In FIG. 1 a state machine replication service 1 is shown having a primary node 2 which includes a rich execution environment REE for performing a byzantine free tolerance application and a TEE being a trusted execution environment on which a unique sequential identifier generator USIG is run. Further backup servers 3 are shown also running a byzantine free tolerance protocol performed in the state machine replication service. A client 4 requests executing a certain operation and sends a request to the primary 2 and all backup servers 3 which are shown in FIG. 2 in more detail.

Figure 2:
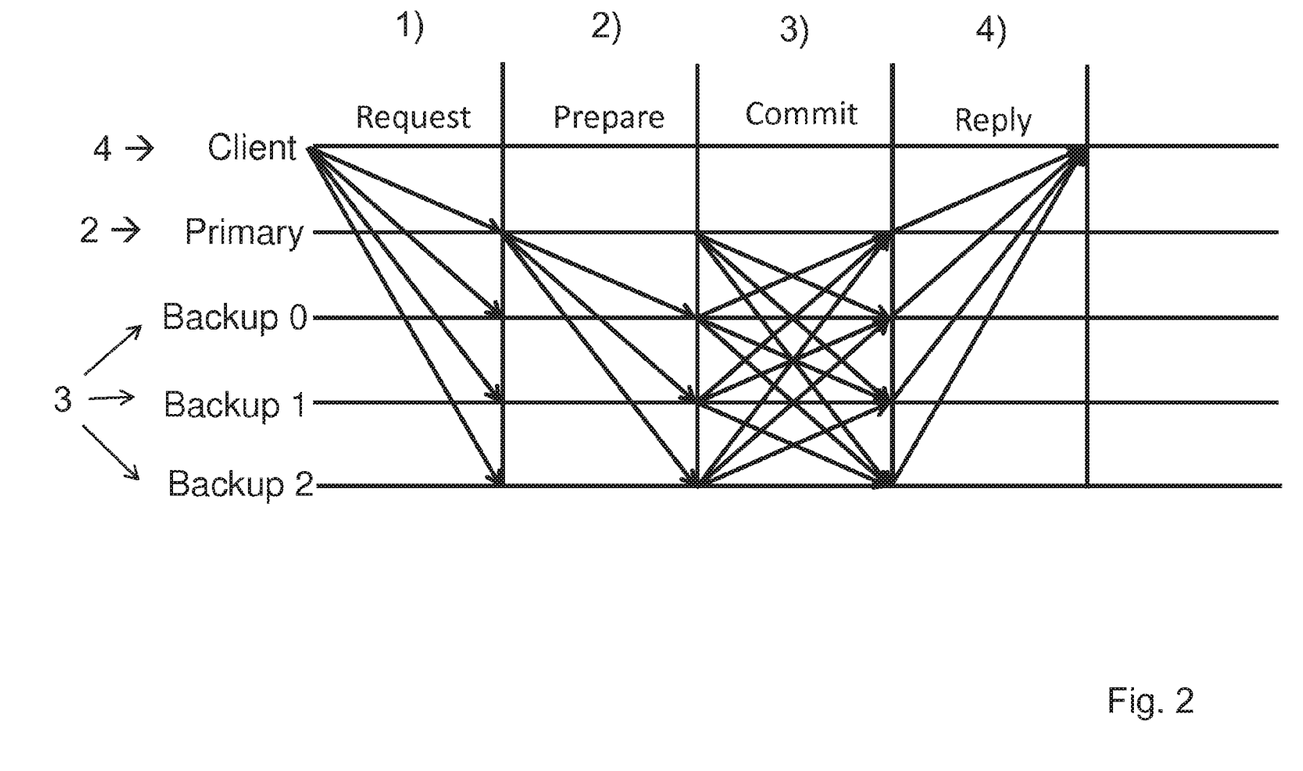
FIG. 2 shows parts of steps of a method according to an embodiment of the present invention.

FIG. 2 shows parts of steps of a method according to an embodiment of the present invention. In FIG. 2 the client 4 sends a request to the primary 2 and to all backup servers 3. Request is performed according to the following:

1) Request: C requests the execution of op by sending all servers $\langle REQUEST, op, id, C \rangle_{\sigma c}$, where id is the request identifier.

In a second step said primary 2 denoted with $S_p$ performs a prepare procedure according to 2):

2) Prepare: $S_p$ multicasts $\langle PREPARE, v, S_p, M, UI_p \rangle$ to all other servers, where $UI_p$ is a sequence number returned by the USIG service in $S_p$.

The primary 2 as well as the backup servers 3 perform a commit procedure 3):

3) Commit: Each $S_i$ multicasts $\langle COMMIT, v, S_i, \sigma_i, S_p, M, UI_p \rangle$ if $UI_p$ is a valid unique identifier on M (i.e. suppose the counter in $UI_p$ is c, then $S_i$ has already accepted a message M' from $S_p$ with a counter value c−1). The TCE on each Si provides signature $\sigma_i$ on $\langle COMMIT, v, S_p, M, UI_p \rangle$. Meanwhile, TCE saves the most updated counter c in $UI_p$ during the signing process.

The primary 2 as well as the backup servers 3 compute a reply message in a further step 4). Step 4) includes 4) Reply: Each $S_i$ executes the operation op after receiving f+1 COMMITs from different servers that match the PREPARE, and then sends a reply ⟨REPLY, $S_i$, id, res⟩ to C.

Figure 3:
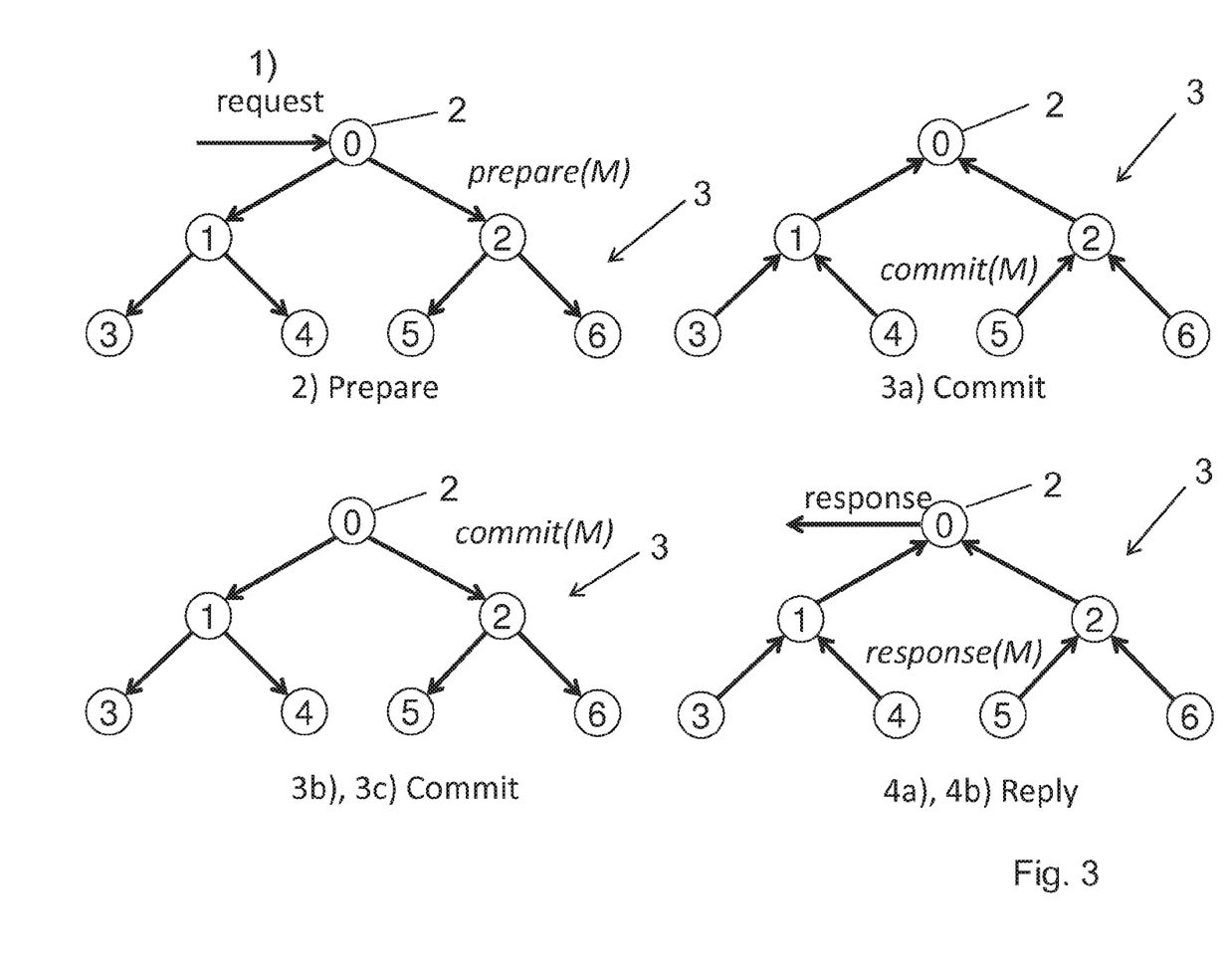
FIG. 3 shows parts of steps of a method according to a further embodiment of the present invention in a tree-topology.

FIG. 3 shows parts of steps of a method according to a further embodiment of the present invention in a tree topology. In FIG. 3 a tree topology between the primary 2 and the backup servers 3 is assumed, wherein the primary 2 is denoted with "0" receiving the request from a client 4 and the other backup servers 3 are organized in a binary tree.

In detail FIG. 3 shows the step 1) to 4):

1) Request: C requests the execution of op by sending all servers ⟨REQUEST, op, id, C⟩$_{\sigma_c}$, where id is the request identifier.

2) Prepare:
   a) $S_p$ sets prepare=⟨PREPARE, v, $S_p$, M, $UI_p$⟩, where M is C's request message, $UI_p$ is the unique identifier returned by its local USIG, and $c_p$ is $S_p$'s local counter.
   b) $S_p$ runs the Announce operation of the collective signing:
   CoSi.Announce(prepare), 3) Commit:
   a) After receiving prepare, each $S_i$ runs the Response operation of the collective signing: CoSi.Response(M).
   b) After the Response operation of CoSi, $S_p$ receives an aggregated signature $\hat{\sigma}$, and a list L which records the identities of each $S_i$ who has given a valid signature.
   c) $S_p$ checks if $|L| \geq f+1$ and the validity of $\hat{\sigma}$. Then it sets commit=⟨COMMIT, v, L, M, $\hat{\sigma}$⟩, and runs CoSi.Announce(commit).

4) Reply:
   a) Each $S_i$ checks whether $\hat{\sigma}$ is a valid aggregated signature of all participants in L. If so, it executes the operation op and then sets reply=⟨REPLY, $S_i$, id, res⟩.
   b) They run CoSi.Response(reply), after which $S_p$ sends the aggregate signature of reply to C.

Figure 4:
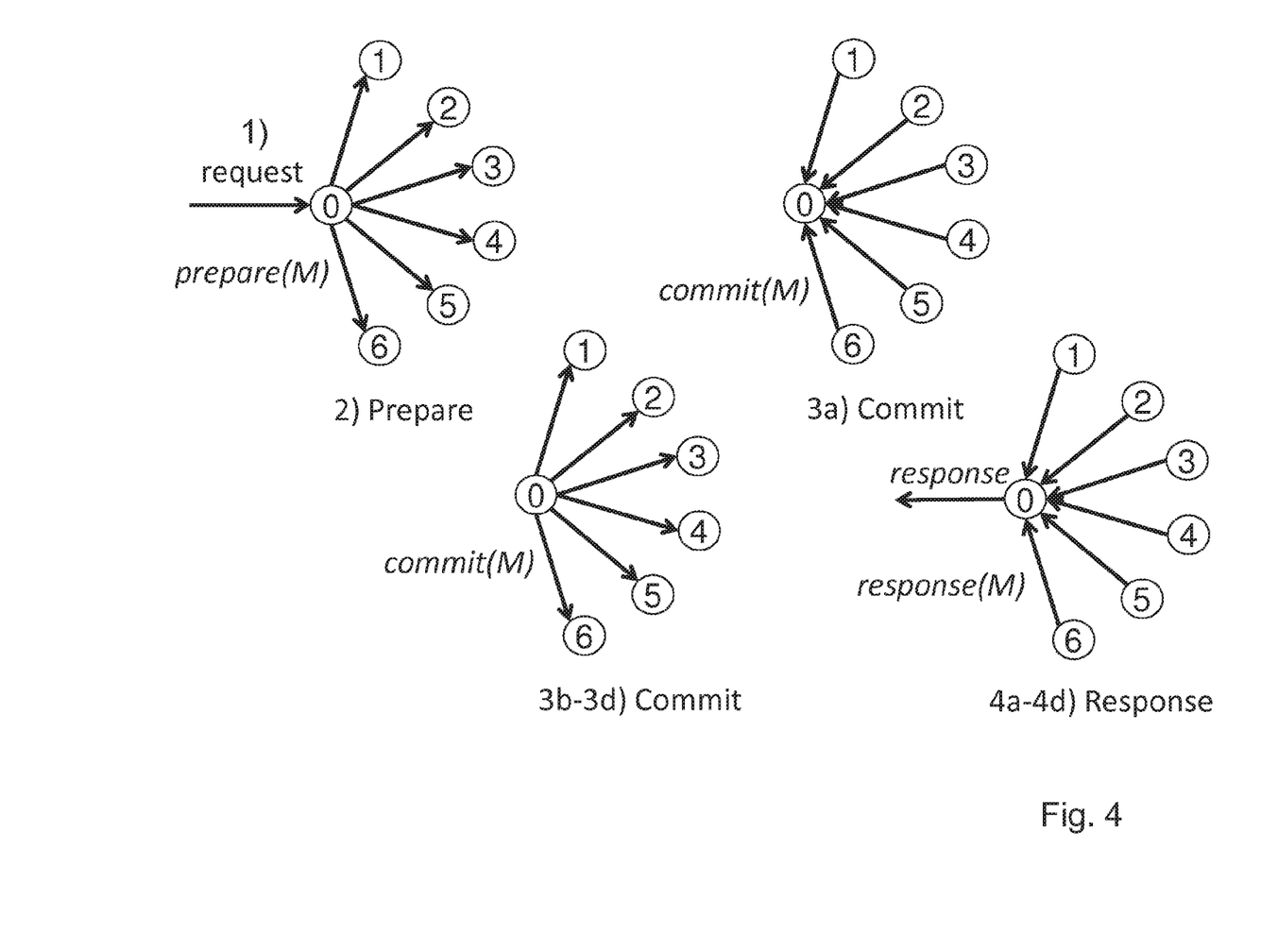
FIG. 4 shows parts of steps of a method according to an embodiment of the present invention in a star topology.

FIG. 4 shows parts of steps of a method according to an embodiment of the present invention in a star like topology. In FIG. 4 multisignature is used and the tree topology of FIG. 3 is replaced by a star topology, which means that all backup servers 3 directly send their signatures to the primary 2 who aggregates all of them and verifies the final signature. If it is a valid signature, the primary 2 send it to all other servers 3. Otherwise it use the binary search to find a wrong signature and only aggregates the valid ones. In detail FIG. 4 shows steps 1) to 4) according to the following:

1) Request: C requests the execution of op by sending all servers ⟨REQUEST, op, id, C⟩$_{\sigma_c}$, where id is the request identifier.

2) Prepare: $S_p$ multicasts ⟨PREPARE, v, $S_p$, M, $UI_p$⟩ to all other servers, where $UI_p$ is a sequence number returned by the USIG service in $S_p$.

3) Commit:
   a) Each $S_i$ replies ⟨COMMIT, v, $S_i$, M, $\sigma_i$⟩ where $\sigma_i$ is a signature on M that allows aggregation.
   b) $S_p$ aggregates the received signatures to get $\hat{\sigma}$. Then it verifies the validity of $\hat{\sigma}$.
   c) If $\hat{\sigma}$ is invalid, S p does a binary search on the received signatures to find the wrong ones. Then calculate a new $\hat{\sigma}$ using only valid signatures.
   d) $S_p$ sends $\sigma_i$ to all other servers.

4) Reply:
   a) Each $S_i$ verifies $\sigma_i$, executes the operation op, and then sends a reply ⟨REPLY, $S_i$, id, res, $\sigma'_i$⟩ to $S_p$, where $\sigma'_i$ is a signature on res that allows aggregation.
   b) $S_p$ aggregates the received signatures to get $\hat{\sigma}'$. Then it verifies the validity of $\hat{\sigma}'$.
   c) If $\hat{\sigma}'$ is invalid, $S_p$ does a binary search on the received signatures to find the wrong ones. Then calculate a new $\hat{\sigma}'$ using only valid signatures.
   d) $S_p$ sends $\hat{\sigma}'$ back to C For example embodiments of the present invention may be based performing the following steps using a practical byzantine fault-tolerance state machine replication protocol PBFT as comprising steps 1) to 4):

1) Request: C requests the execution of op by sending all servers⟨REQUEST, op, $\sigma_c$, C⟩, where $\sigma_c$ is C's signature on op.

2) Prepare: $S_p$ multicasts ⟨PREPARE, M, v, $UI_p$, $S_p$⟩ to all other servers, where M is the request message, v indicates the view number, $UI_p$ is a unique identifier returned by $S_p$'s USIG service on input H(M).

3) Commit: Each $S_i$ multicasts ⟨COMMIT, v, $UI_p$, $UI_i$, $S_i$⟩ if $UI_p$ is a valid unique identifier on M (i.e., suppose the counter value of the last message accepted by $S_i$ is c−1, then the counter value in $UI_p$ is c). The TCE on each $S_i$ provides signature $\sigma_i$ on ⟨COMMIT, v, $S_p$, M, $UI_p$⟩. Meanwhile, TCE saves the most updated counter c in $UI_p$ during the signing process.

4) Reply: Each $S_i$ executes the operation op after receiving f+1 COMMITs with valid UIs from different servers that match the PREPARE, and then sends a reply ⟨REPLY, $S_i$, res⟩ to C.

When performing these steps a faulty primary can prevent progress by not assigning PREPARE to some requests, or even to any requests at all. When the primary is faulty, a view change may be executed and a new primary chosen. View changes may be triggered by timeout as follows:

1) When $S_i$ receives a request from C, it starts a timer. If the timer expires, $S_i$ suspects that the primary is faulty and starts a view change by sending ⟨REQ-VIEW-CHANGE, v, v' $S_i$⟩ to all servers, where v is the current view number and v'=v+1 is the new view number.

2) After receiving f+1 REQ-VIEW-CHANGE messages, $S_i$ moves to v' and multicasts ⟨VIEW-CHANGE, v', $C_{latest}$, O, $UI_i$ $S_i$⟩, where $C_{latest}$ is the latest stable checkpoint certificate and O is a set of all messages (i.e., PREPARE, COMMIT, VIEW-CHANGE and NEW-VIEW) sent by $S_i$ since the latest checkpoint was generated. $UI_i$ is the signature of $S_i$'s TCE on the latest primary counter value which is updated when $S_i$ sends each COMMIT message. At this point, $S_i$ stops accepting messages for v.

3) After receiving f+1 VIEW-CHANGE messages, the new primary $S_{p'}$ for view v' multicasts ⟨NEW-VIEW, v', $V_{vc}$, S, $UI_{p'}$, $S_{p'}$⟩, where $V_{vc}$ is a set containing the valid VIEW-CHANGE messages received by $S_{p'}$ plus the one sent by $S_{p'}$, and S is a set of all messages since the checkpoint (can be calculated from the VIEW-CHANGE messages).

4) When a backup $S_i$ receives a NEW-VIEW message, it verifies if S was computed properly doing the same computation as $S_i$. Then it begins the new view v' after all requests in S that have not been executed before are executed.

When there is a view change the first sequence number for the new view has to be defined. This value is the counter value in the unique identifier $UI_{p'}$ in the NEW-VIEW message plus one. The next PREPARE message sent by the new primary must follow the $UI_{p'}$ in the NEW-VIEW message.

Each server needs to keep a vector with the highest counter value it received from each of the other servers in PREPARE, COMMIT, CHECKPOINT and VIEW-CHANGE messages.

In a further embodiment the present invention provides a method for byzantine free tolerance data replication comprising the steps of:
1. A primary node among all replica nodes is assigned according to the current view to serve as an entry point of the consensus network.
2. All replica nodes are organized as a tree with the primary node as the top-level root.
3. When the primary node receives a REQUEST message, it passes the message (or the corresponding message digest) to its trusted computing component.
4. The trusted computing component of the primary node increments the internal monotonic counters and returns a signature on the input message as well as the counter value. Note that the cryptographic scheme used for the signing should have the key homomorphic property.
5. The primary node encapsulates the signature and the request message into a PREPARE message, which also includes the value of the view number and the assigned counter value. The primary node propagates the PREPARE message to its children, which further propagate it to their children.
6. All the rest of the nodes verify the PREPARE message against the prepare signature and the counter value. A message is accepted if the signature is valid and the counter is incremental.
7. Once the PREPARE message is accepted, the nodes also pass the request message to their trusted computing component for a signature on the message but without the counter information.
8. The nodes then encapsulate the obtained signature and the PREPARE message into a COMMIT message and send it to their parents. For non-leaf nodes, they first wait for and verify the COMMIT messages from their children and combine their commit signatures with those of their children using the key-homomorphic property of the signing scheme.
9. The primary node performs the final aggregation of the commit signature and propagates the aggregated COMMIT message to all nodes.
10. All nodes will verify the aggregated COMMIT message and accept it if the commit signature matches the prepare signature (i.e., signature on the same message), and if the commit signature is a valid aggregated signature of at least f+1 replica nodes in the network.
11. Nodes who accept the aggregated COMMIT message execute the requested operation.
12. If the height of the tree is only 2, i.e., all nodes except the primary node are leaf nodes, the primary node can do a lazy check on the received COMMIT messages. In other words, the primary node first aggregates all the received COMMIT messages. If the aggregated COMMIT message is valid, the primary node will propagate it; otherwise, the primary node will verify each of the received COMMIT messages, and only aggregate those that are valid.

Some or all embodiments may be at least in part based on or using MinBFT as disclosed in the non-patent literature of G. S. Veronese, M. Correia, A. N. Bessani, L. C. Lung, and P. Verissimo, "Efficient byzantine fault-tolerance," IEEE Transactions on Computers, vol. 62, no. 1, pp. 16-30, January 2013, which is herein incorporated by reference.

Some or all embodiments of the present invention may be at least in part based on or using a collective signing procedure as shown in the non-patent literature of E. Syta, I. Tamas, D. Visher, D. I. Wolinsky, L. Gasser, N. Gailly, and B. Ford, "Keeping authorities "honest or bust" with decentralized Witness cosigning," in 37th IEEE Symposium on Security and Privacy, 2016, which is herein incorporated by reference.

Some or all embodiments of the present invention may be at least in part based on or using a practical byzantine fault tolerance procedures as disclosed in the non-patent-literature of M. Castro and B. Liskov, "Practical byzantine fault tolerance," in Proceedings of the Third Symposium on Operating Systems Design and Implementation, ser. OSDI '99. Berkeley, Calif., USA: USENIX Association, 1999, pp. 173-186, available online http://dl.acm.org/citation.cfm?id=296806.296824, which is herein incorporated by reference.

In summary the present invention enables a reduction in a number of required service from 3f+1 to 2f+1 and the number of communication rounds from 3 to 2. Further embodiments of the present invention enable a performance of a trusted computing entity solely CPU-based further enabling exclusion of any other bottleneck.

Further embodiments of the present invention enable or provide
1. Hardware-assisted BFT (e.g., based on MinBFT, MinZYZZYVA) by only using the monotonic counters on the primary nodes in the "prepare" messages instead of maintaining multiple counters on all replica nodes in "commit" messages. As a result, only the primary server needs a USIG service instead of all servers.

Further its communication complexity from $O(n^2)$ to $O(n)$ is improved using multisignature.
  i.) A tree structure as CoSi is used to distribute both communication and computation for the root node. However, each round requires $O(\log n)$ steps of communication instead of one step.
    The collective communication is used to make the tree-based communication more robust to the failures of intermediate nodes.
  ii.) Even further assuming that crash failures happen as usual, while Byzantine failures rarely happen, Byzantine failures can be detected and tolerated in a relatively cheap way. Here the multisignature as CoSi is used, but the tree structure is replaced with a star structure. That is, all servers directly send their signatures to the primary, who aggregates all of them and verify the final signature. If it is a valid signature, the primary just sends it to all servers. Otherwise, it uses binary search to find the wrong signatures and only aggregates the valid ones. This enables the same message complexity of $O(n)$, but only one step of communication of each round. The primary needs $O(n)$ computation to aggregate the signatures, since other servers cannot share the burden for it. However, the aggregation for Schnorr multisignature is less expensive: only needs $O(n)$ additions. In failure-free mode, the primary only needs to do one signature verification, while in failure-presence mode, it needs to do O(f log n) verifications.
2. A new USIG service provided by combining a software-based counter with a hardware based attestable TEE.
   i.) In more detail each server is assumed to hold a hardware counter (e.g. TPM monotonic counter), which will be increased by one automatically after machine rebooting. Therefore, a two-layer counter is generated: After each rebooting, the trusted hardware reads the current hardware counter value C, generates its own counter c with value of zero, and keeps (C, c) in its memory. When the primary requests a UI for a message M, the trusted hardware signs M together with (C, c), and increases the value of c by one. Each server will accept this UI only when its expected counter value from the primary is (C, c). The hardware counter will be increased to C=C+1 if the primary $S_p$ reboots again (e.g., due to crash). In this case, other servers won't accept (C, c) no matter what c is, instead, they will initialize a view change. In other words although the nonce can be generated only rarely, the computation of a next USIG is very fast because the counter can be incremented without the use of a trusted execution environment.
   ii.) The trusted hardware generates a random ephemeral nonce N and a counter c with value 0 after each machine rebooting. At the beginning of each view, the primary lets its local TA generate a signature (c, N)σp and sends it to all other servers. Each server verify it, and they expect an receive a counter value of c+1 for the next message. Whenever a server sees a different nonce from the primary, it will initialize a view change.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for byzantine fault-tolerant replication of data on a plurality of n servers, wherein the n servers include one primary node (PN) and n−1 replica nodes (REPN), wherein all n servers include a trusted computing entity (TCE), and wherein the PN receives a request message from a client, the method comprising:
   performing, by the PN, a prepare procedure that includes:
      computing a prepare message including a unique identifier (UI) computed by the TCE of PN, and
      multicasting the prepare message to the REPN,
   performing, by the PN, a commit procedure that includes:
      receiving, from each of a portion of the REPN, a prepare message reply signature part and aggregating each of the prepare message reply signature parts to generate a prepare message reply aggregated signature,
      checking the validity of the prepare message reply aggregated signature, and
      upon determining that the prepare message reply aggregated signature is valid, computing a commit message including the prepare message reply aggregated signature and multicasting the commit message to the REPN; and
   performing, by the PN, a reply procedure that includes:
      receiving, from each of the portion of the REPN, a commit message reply signature part and aggregating each of the commit message reply signature parts to generate a commit message reply aggregated signature, and
      transmitting, to the client, the commit message reply aggregated signature.

2. The method according to claim 1, wherein the prepare message further includes at least a portion of content of the request message.

3. The method according to claim 1, wherein the portion of the REPN includes at least f+1 REPN, f being a number of Byzantine faulty servers.

4. The method according to claim 1, wherein the UI computed by the TCE of PN is a sequence number computed by a unique sequential identifier generator (USIG) run on the TCE of the PN.

5. The method according to claim 4, wherein the TCE of the PN maintains a counter having a counter value, and wherein the prepare procedure further includes incrementing, by the TCE of the PN, the counter value.

6. The method according to claim 5, wherein the UI includes the incremented counter value.

7. The method according to claim 6, wherein each prepare message reply signature part is received by the PN from an REPN that has verified that the UI included in the prepare message is valid.

8. The method according to claim 7, wherein each REPN that has verified that the UI included in the prepare message is valid has determined that the incremented counter value is greater than a counter value included in a previously received UI.

9. The method according to claim 1, wherein the PN is selected out of the plurality of n servers and wherein, when the PN is determined to be faulty, a new PN out of the REPN is selected.

10. The method according to claim 9, wherein a PN is determined faulty by an REPN by not receiving a prepare message after expiry of a certain time after receiving the request message.

11. The method according to claim 10, wherein a new PN is selected by:
   requesting a view change by a first REPN after expiry of the certain time period by sending a change message to all other REPN, multicasting a view change message, after having received change messages from at least a portion of all other REPN, by the first REPN, a set of all messages since a last checkpoint was generated together with a checkpoint certificate, selecting a the first REPN as the new PN when having received f+1 view change messages and the first REPN multicasts a new view message indicating that a new PN is established.

12. The method according to claim 1, further comprising choosing, by the PN and each of the REPN, a random secret key; and computing, by the PN and each of the REPN, a public key.

13. The method according to claim 12, further comprising selecting, by the PN and each of the REPN, a random secret; and computing, by the PN and each of the REPN, a respective individual commit based on its respective random secret.

14. A system for byzantine fault-tolerant replication of data, the system comprising:

a plurality of n servers, the n servers including a primary node (PN) and n−1 replica nodes (REPN), and wherein each of the n servers includes a trusted computing entity (TCE), wherein the PN is configured to perform, in response to receiving a request message from a client, a prepare procedure that includes:

computing a prepare message including a unique identifier (UI) computed by the TCE of PN, and multicasting the prepare message to the REPN, wherein the PN is further configured to perform a commit procedure that includes:

receiving, from each of a portion of the REPN, a prepare message reply signature part and aggregating each of the prepare message reply signature parts to generate a prepare message reply aggregated signature, checking the validity of the prepare message reply aggregated signature, and upon determining that the prepare message reply aggregated signature is valid, computing a commit message including the prepare message reply aggregated signature and multicasting the commit message to the REPN; and wherein the PN is further configured to perform a reply procedure that includes:

receiving, from each of the portion of the REPN, a commit message reply signature part and aggregating each of the commit message reply signature parts to generate a commit message reply aggregated signature, and transmitting, to the client, the commit message reply aggregated signature.

15. A non-transitory computer readable medium storing a program that when executed by a processor of a primary node (PN) selected from a plurality of n servers, causes the PN to execute a method for byzantine fault-tolerant replication of data on the n servers, wherein the n servers includes the PN and n−1 replica nodes (REPN), and wherein all n servers have a trusted computing entity (TCE), the method comprising:

performing a prepare procedure that includes:

computing a prepare message including a unique identifier (UI) computed by the TCE of PN, and multicasting the prepare message to the REPN, performing a commit procedure by:

receiving, from each of a portion of the REPN, a prepare message reply signature part and aggregating each of the prepare message reply signature parts to generate a prepare message reply aggregated signature, checking the validity of the prepare message reply aggregated signature, and upon determining that the prepare message reply aggregated signature is valid, computing a commit message including the prepare message reply aggregated signature and multicasting the commit message to the REPN; and performing a reply procedure by:

receiving, from each of the portion of the REPN, a commit message reply signature part and aggregating each of the commit message reply signature parts to generate a commit message reply aggregated signature, and transmitting, to the client, the commit message reply aggregated signature.

\* \* \* \* \*